(12) United States Patent
Houde et al.

(10) Patent No.: US 9,851,837 B2
(45) Date of Patent: Dec. 26, 2017

(54) TOUCHSCREEN DISPLAY ASSEMBLY FOR HARSH ENVIRONMENT

(71) Applicants: Francois Houde, Quebec (CA); Sylvain Fillion, Levis (CA)

(72) Inventors: Francois Houde, Quebec (CA); Sylvain Fillion, Levis (CA)

(73) Assignee: Olympus Scientific Solutions Americas, Inc., Waltham, MA (US)

( * ) Notice: Subject to any disclaimer, the term of this patent is extended or adjusted under 35 U.S.C. 154(b) by 60 days.

(21) Appl. No.: 14/980,420

(22) Filed: Dec. 28, 2015

(65) Prior Publication Data
US 2017/0185206 A1   Jun. 29, 2017

(51) Int. Cl.
*G06F 3/041* (2006.01)

(52) U.S. Cl.
CPC .......... *G06F 3/0416* (2013.01); *G06F 3/0412* (2013.01); *G06F 2203/04103* (2013.01)

(58) Field of Classification Search
CPC ............. G06F 3/0412; G06F 3/0416; G06F 2203/04103; G06F 2203/041
See application file for complete search history.

(56) References Cited

U.S. PATENT DOCUMENTS

| 2005/0046622 A1* | 3/2005 | Nakanishi | G06F 3/045 |
|---|---|---|---|
| | | | 345/173 |
| 2013/0082925 A1* | 4/2013 | Sato | G06F 3/044 |
| | | | 345/157 |

* cited by examiner

*Primary Examiner* — Towfiq Elahi
(74) *Attorney, Agent, or Firm* — C. Tricia Liu

(57) ABSTRACT

Disclosed is a touchscreen display assembly for use in harsh environments. The touchscreen cable emerges from the touchscreen through a hole in a glass panel. The hole is inside the perimeter of a sealing strip which forms the seal for the touchscreen airgap. The touchscreen may be assembled and tested independently, and subsequently integrated with a display screen and protective front cover. The seal to the front cover is made without the need for a bezel overlapping the touchscreen top film, thereby avoiding possible damage to the touchscreen. Elimination of the bezel allows the touchscreen display assembly to have an attractive planar front surface, and also avoids accumulation of dirt between a bezel and the touchscreen top film.

22 Claims, 4 Drawing Sheets

Section A-A   Detail B

Section A-A

Section A-A    Detail B

TOUCHSCREEN DISPLAY ASSEMBLY FOR HARSH ENVIRONMENT

FIELD OF THE INVENTION

The invention relates to resistive touchscreen displays for use in a harsh environment, and more particularly to methods of constructing the touchscreen to facilitate creation of a sealed assembly comprising the touchscreen, a display and a protective enclosure.

BACKGROUND OF THE INVENTION

Resistive touchscreens generally comprise two sheets coated with a resistive material and separated by an airgap. The front sheet is made of a thin and flexible material, and the back sheet, usually glass, may be a thicker, less flexible material. The surfaces of both sheets on the airgap side may be coated with a transparent conductive material, such as indium tin oxide (ITO). Touching the front sheet with, for example, a finger or a stylus, causes it to deform so that it contacts the glass panel allowing the location of the touch to be determined by measurements of resistance.

In order to avoid damage to sensitive touchscreen components and components inside the enclosure by exposure to dirt, particles or corrosive vapors, it is important to provide a reliable front seal between the touchscreen and a protective front casing. In existing practice, the front seal is usually made by interposing a gasket between the front sheet and a bezel, with the bezel being that part of the front casing which overlaps the front sheet. Since the front sheet is necessarily thin and flexible, it has been difficult in existing practice to create a reliable front seal without the gasket deforming or restraining the front sheet in such a way that correct operation of the touchscreen is compromised or even prevented. The difficulty in sealing resistive touchscreens is to be contrasted with capacitive touchscreens in which a relatively thick protective glass front cover may be used, allowing much easier sealing to the front cover.

Use of a gasket on top of the front sheet is largely driven by the need to make electrical contacts available outside the touchscreen. In existing practice this is usually done by arranging for a suitable flat touchscreen cable to emerge from the plane of the airgap. To allow the cable to emerge behind the front cover, the front seal needs to be outside the plane of the airgap, namely on top of the front sheet. A similar consideration applies to the need for a venting aperture in the plane of the airgap. Use of a venting aperture is optional, but when required its purpose is to allow equalization of the airgap pressure with the external environment.

The need for a bezel to accomplish the front seal is also a significant disadvantage. Unsightly dirt and grime tends to accumulate in the gap between the bezel and the front sheet. Moreover, the bezel prevents achieving an aesthetically pleasing planar front surface for the touchscreen display.

In order to highlight the advantages of the present invention, a typical prior art touchscreen and display assembly will first be described, followed by a detailed description of a preferred embodiment of the present invention. In the descriptions, items performing similar functions in both the prior art and in the invention are designated with the same numeral, but with the numeral for the prior art item being followed by a prime symbol ('). It should be noted that construction of items with the same numeral may be quite different and that use of the same numerals is made only for the sake of clarity of the description.

FIG. 3A is a schematic partial plan view of a prior art touchscreen display with its front casing removed. A front sheet 10' is the surface presented to the user for touching and for thereby activating the functions of the touchscreen. A gasket 20', made of any suitable soft material such as an elastomer, is placed on top of and on the outer perimeter of front sheet 10'.

FIG. 3B is a section view in the plane C-C of FIG. 3A, and FIG. 3C is an expanded section view of Detail D of FIG. 3B. FIGS. 3B and 3C show an integrated display screen 18', and also include views of a front casing 16', which is not shown in FIG. 3A. It can be seen that gasket 20' is in contact both with front sheet 10' and a bezel 24', with bezel 24' being defined as that part of casing 16' which overlaps the outer perimeter of front sheet 10'. Gasket 20', being of soft material, and being compressed between front sheet 10' and bezel 24', forms a seal designed to prevent ingress of dirt, particles and corrosive vapors.

It should be noted that the need for contact between gasket 20' and front sheet 10' is a significant disadvantage of the prior art design because there is a danger that proper operation of the touchscreen may be degraded or altogether prevented. In particular, any direct contact or bonding between front sheet 10' and bezel 24' will restrict free movement of front sheet 10' and must be avoided. It is therefore difficult both to ensure a reliable seal and to avoid inadvertent interruption of touchscreen operation.

A further disadvantage is the need to use bezel 24' to mount and seal the touchscreen display, making it impossible to achieve a more aesthetically pleasing smooth front face. In addition, the gap between bezel 24' and front sheet 10' tends to collect unsightly particles of dirt 22' as shown in FIG. 3C.

The particular design and location of gasket 20' in the prior art has been driven by the need to allow access into the touchscreen display enclosure (not shown) of a touchscreen cable 6' and an optional vent aperture 14'. Touchscreen cable 6' may be any type of flat cable, but is usually a flexible printed circuit (FPC) cable whose function is to make the necessary electrical connections for operation of the touchscreen. Touchscreen cable 6' is connected at one end to a number of touchscreen electrodes 12' and passes through a hole 26' in front casing 16'. Touchscreen electrodes 12' are thin layers of conductive material which are printed or deposited on the inner surfaces of a glass panel 8' and front sheet 10'. In a typical example, there may be two electrodes 12' on glass panel 8' and two electrodes 12' on front sheet 10', and cable 6' has four conductors, with one conductor being connected to each electrode. An adhesive sheet 2' is placed between the touchscreen electrodes 12', and serves to seal an airgap 9' between top sheet 10' and glass panel 8'. Vent aperture 14' is optionally provided to allow equalization of air pressure between touchscreen airgap 9' and the external environment if required. Vent aperture 14' consists of a gap in adhesive sheet 2' (shown by dotted lines in FIG. 3A), and a corresponding hole (not shown) in front casing 16'. Due to the need for access into the touchscreen display enclosure of touchscreen cable 6' and vent aperture 14', while still providing a seal between the touchscreen and front casing 16', gasket 20' has been designed to lie in a plane exterior to the plane of touchscreen cable 6', adhesive sheet 2' and vent aperture 14'. This is most clearly shown in FIG. 3C.

SUMMARY OF THE INVENTION

According to the invention, a hole is provided in the glass panel to allow the touchscreen cable to emerge from the plane of the airgap. The hole is located within the perimeter of a top seal strip between the front sheet and glass panel which seals the touchscreen airgap. The touchscreen is sealed to the front casing by a bottom seal which is located between the front casing and the outer surface of the glass panel. No gasket in contact with the front sheet is required.

The invention eliminates the need for a gasket on top of the front sheet, thereby avoiding the risk of damage to the sensitive front sheet. At the same time, the need for a bezel is eliminated, thereby allowing an aesthetically pleasing planar front surface and avoiding accumulation of unsightly dirt between the bezel and the front sheet.

DETAILED DESCRIPTION OF PREFERRED EMBODIMENT

Figure 1:
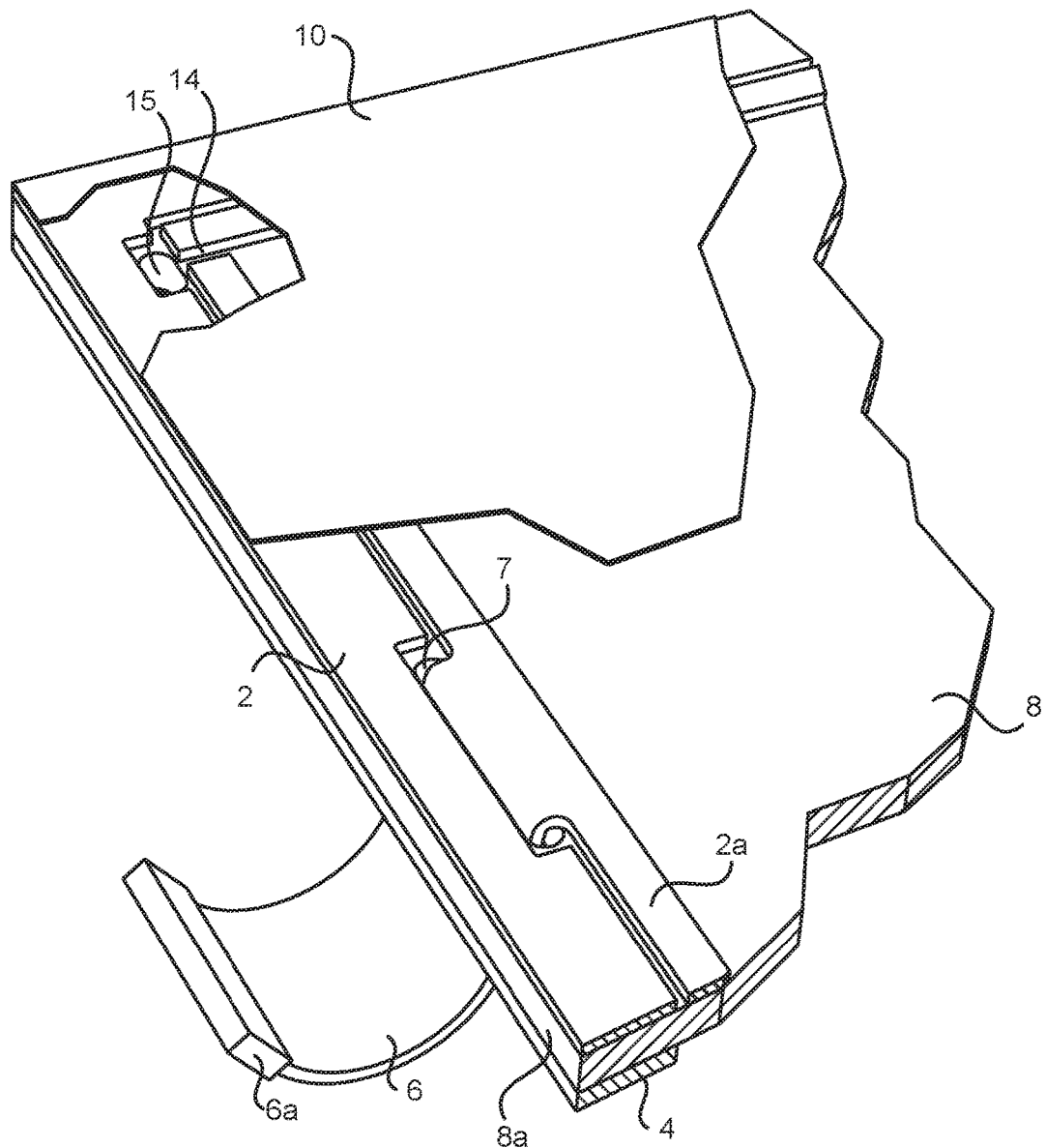
FIG. 1 is a partial perspective view of a touchscreen unit according to the present disclosure.
Figure 2A:
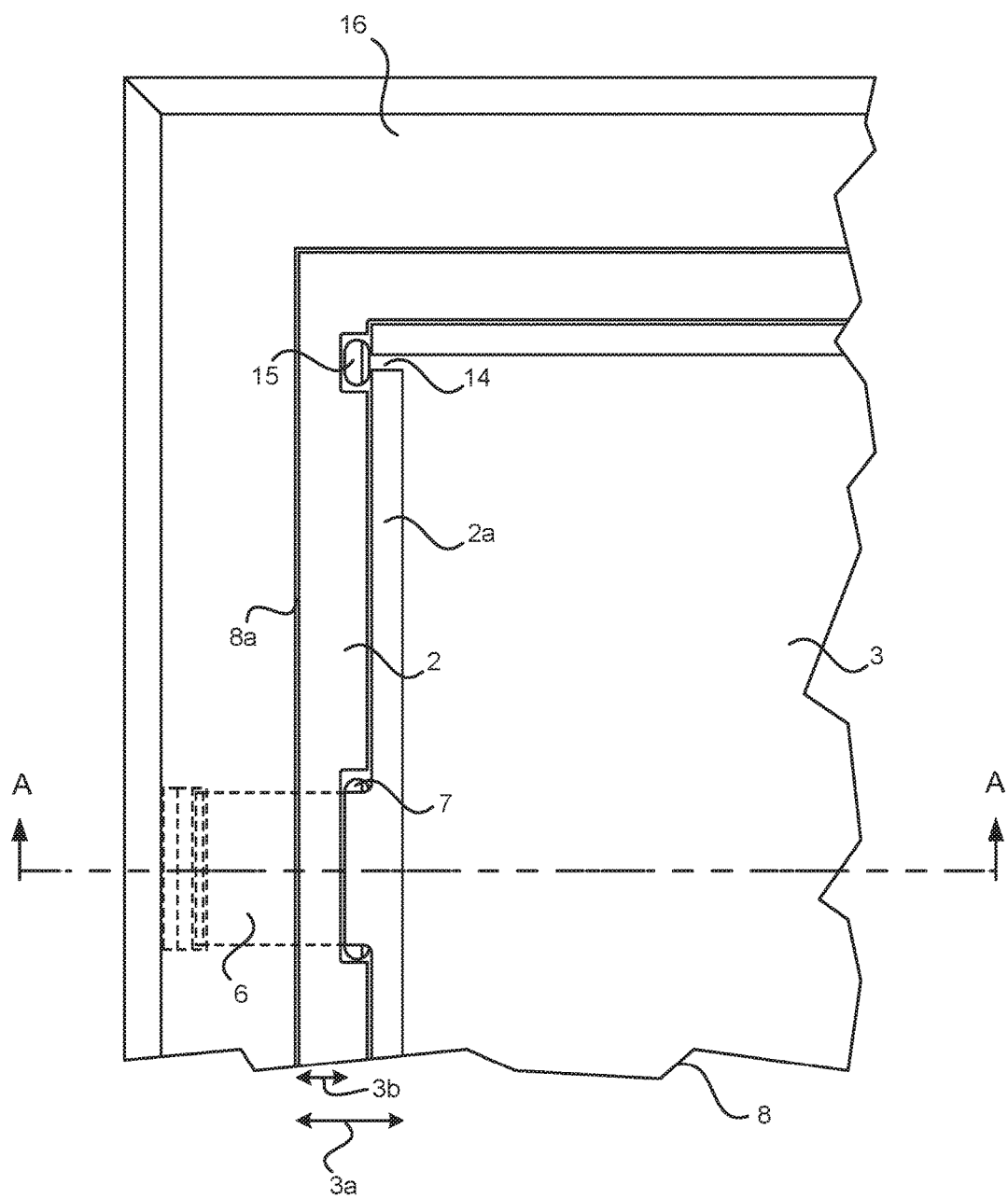
FIG. 2A is a partial plan view of a touchscreen display assembly according to the present disclosure with the front sheet removed.
Figure 2B:
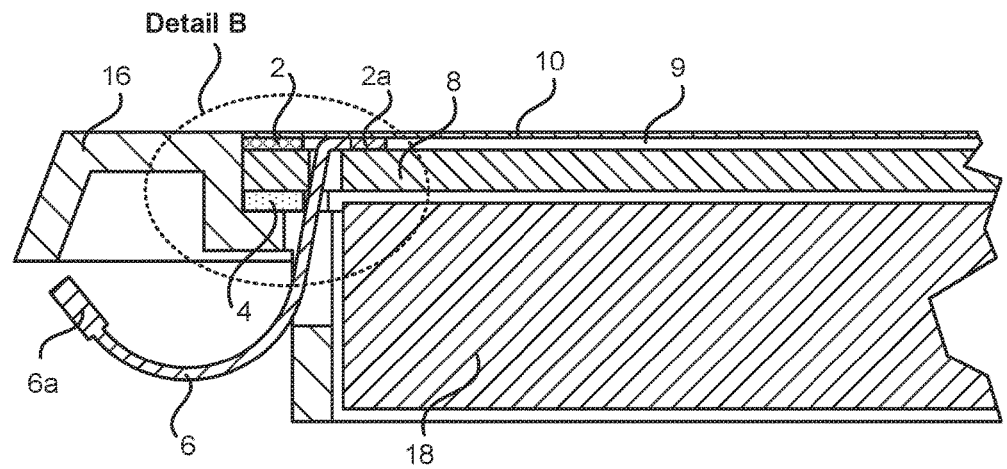
FIG. 2B is a partial section view in the plane A-A of a touchscreen display assembly according to the present disclosure.
Figure 2C:
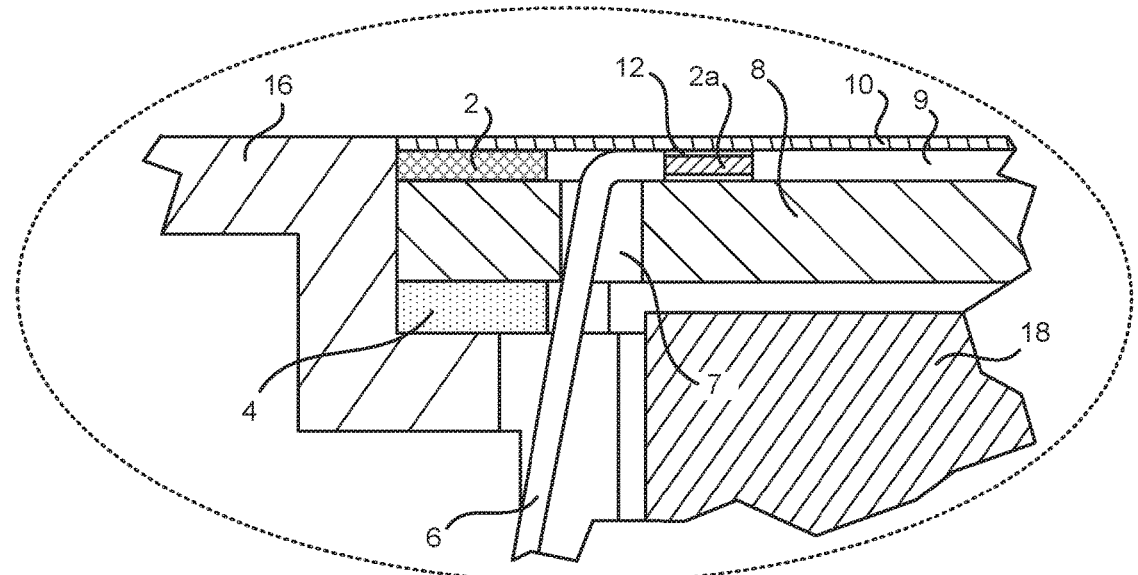
FIG. 2C is a detailed partial section view in the plane A-A of a touchscreen display assembly according to the present disclosure.
Figure 3A:
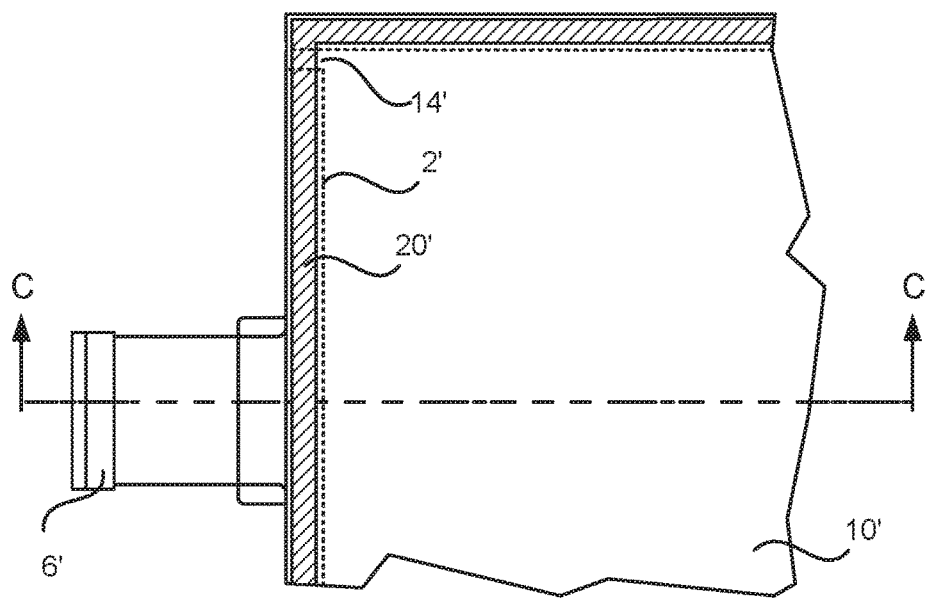
FIG. 3A is a partial plan view of a prior art touchscreen display with the front sheet removed.
Figure 3B:
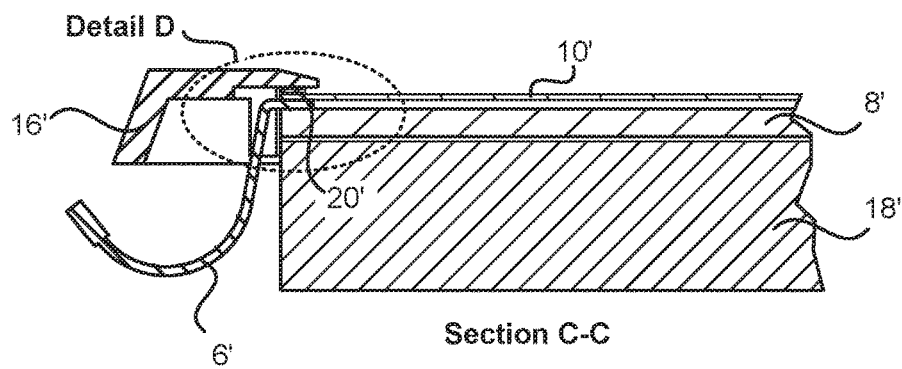
FIG. 3B is a partial section view in the plane C-C of a prior art touchscreen display.
Figure 3C:
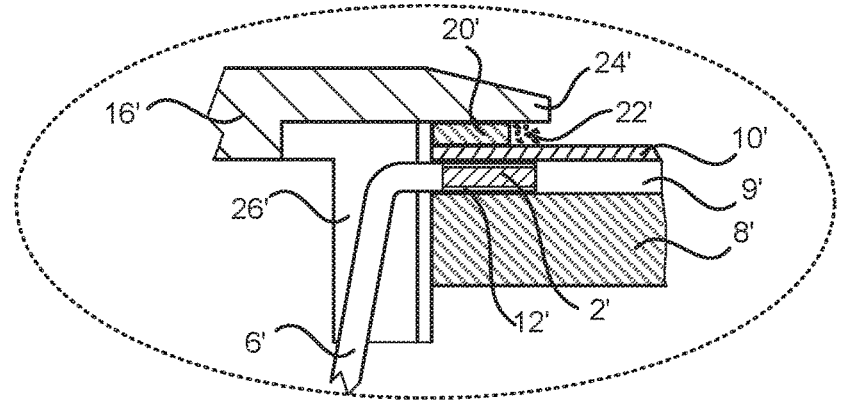
FIG. 3C is a detailed partial section view in the plane C-C of a prior art touchscreen display.

An embodiment of a touchscreen display according to the present disclosure is described, and may be best understood by referring to FIG. 1 in conjunction with FIGS. 2A, 2B and 2C.

FIG. 1 shows a partial perspective view of a touchscreen according to the present disclosure. Note that FIG. 1 shows the components of a complete touchscreen before integration with a display screen 18. On the other hand, FIGS. 2A, 2B and 2C show views of a touchscreen after integration with a front casing 16 and display screen 18. Front casing 16 is therefore shown in FIGS. 2A, 2B and 2C, but not in FIG. 1.

A front sheet 10 is the surface presented to the user for touching and for thereby activating the functions of the touchscreen. In an embodiment, front sheet 10 may comprise an ITO-coated film or glass which is optionally laminated to a protective overlay made of very thin glass or polyester. In FIG. 1, front sheet 10 has been schematically cut away for the purpose of exhibition to reveal other features of the touchscreen assembly. A glass panel 8, having a glass peripheral edge 8a, is shown relatively thicker than front sheet 10 (see also FIG. 2B). In an embodiment, glass panel 8 may comprise a glass or polycarbonate sheet, either coated with ITO or laminated to an ITO-coated film on the inner surface facing front sheet 10. An top inner seal strip 2a is located between touchscreen electrodes 12, which are printed or deposited on the inner surfaces of front sheet 10 and glass panel 8 (see FIG. 2C). Top inner seal strip 2a bonds together front sheet 10 and glass panel 8 and defines the periphery of the touch-sensitive area, which is a rectangular inner working area 3. On the outer side of top inner seal strip 2a is an top outer seal strip 2 which forms another bond between front sheet 10 and glass panel 8. Top outer seal strip 2 and top inner seal strip 2a may either be separate sheets as shown in the figures, or they may be constructed as a single combined top seal strip.

Glass panel 8 has two holes, a cable hole 7 and a vent hole 15 which are most clearly shown in FIGS. 1 and 2A. Vent hole 15 is optional and may be either omitted or, alternatively, the functions of cable hole 7 and vent hole 15 may be combined in a single hole. Cable hole 7 and vent hole 15 may be created by etching or by some other suitable means. It should be noted that creation of cable hole 7 and optional vent hole 15 in glass panel 8 is an important novel aspect of the present invention.

Cable hole 7 allows a touchscreen cable 6 to emerge from the plane of a touchscreen airgap 9. Touchscreen cable 6 contacts touchscreen electrodes 12 at one end and has an electrical connector 6a at the other end. Touchscreen cable 6 may be any type of flat cable, but is usually a flexible printed circuit (FPC) cable. Necessary outside electrical connections for operation of the touchscreen are made by means of electrical connector 6a and touchscreen cable 6.

Vent hole 15 allows venting of touchscreen airgap 9 through a vent aperture 14 (see FIGS. 1 and 2A) in top inner seal strip 2a. In alternative embodiments, vent hole 15 may be combined with cable hole 7 or may be omitted altogether.

It should be noted that the touchscreen assembly depicted in FIG. 1, consisting of glass panel 8, bonded to front sheet 10 by means of top outer seal strip 2 and top inner seal strip 2a, and incorporating touchscreen electrodes 12 and touchscreen cable 6, forms a complete, functional touchscreen which may be assembled and tested independently of a display and enclosure. This is an important and novel aspect of the present invention.

Note that front sheet 10 has a sheet edge configured to be flush with the outer edge of top outer seal strip 2 and with the outer edge of glass panel 8.

FIGS. 2B and 2C show how the touchscreen is integrated with a display screen 18, which may be a liquid crystal display (LCD) or any other type of flat panel display screen. Integration is achieved by means of a bottom seal 4, which forms a seal between the outer side of glass panel 8 and a surface of front casing 16. Bottom seal 4 may be made of any suitable soft material such as an elastomer. Front casing 16 is configured to hold display screen 18 in close proximity to glass panel 8.

It should be noted that front casing 16 has no bezel, meaning that there is no portion of front casing 16 which overlaps any portion of front sheet 10. This has a number of important advantages. The first advantage is that there is no possibility of front casing 16 interfering with operation of the touchscreen. As described above, functionality of the touchscreen may be tested before integration with front casing 16, and since there is no contact with sensitive front sheet 10 during integration, continued reliable operation of the touchscreen may be assured.

Another advantage of not having a bezel is that the touchscreen display assembly may present an entirely planar surface to the user, which is aesthetically pleasing. A further advantage is that, in the absence of a bezel, there is no gap at the perimeter of front sheet 10 which may allow build-up of unsightly dirt and grime. Yet another advantage is that, in the absence of a bezel, the touchscreen may be assembled from the front, which may allow increased flexibility in the overall design of the touchscreen display.

It should be noted that the structural configuration enables an important novel aspect of the present disclosure. As can been seen in FIG. 2A, between glass panel peripheral edge 8a and inner working area 3, encircling inner working area 3, there is a peripheral area 3a in a strip-like shape along peripheral edge 8a. In peripheral area 3a, there is at least one cable hole 7 holed through the glass panel, the hole leaving seal strip area 3b between the edge and the hole. Touchscreen electrodes 12 are laid along peripheral area 3a, in between inner working area 3 and cable hole 7. Each of the electrodes is connected to cable 6, and cable 6 is threaded through cable hole 7 out of glass panel 8. Then top outer seal strip 2 is laid along seal strip area 3b, configured to bond together front sheet 10 and glass panel 8. This structure allows front sheet 10 to completely cover inner working area 3, electrodes 12, cable hole 7 and top outer seal strip 2.

Although the present invention has been described in relation to particular embodiments thereof, it can be appreciated that various designs can be conceived based on the teachings of the present disclosure, and all are within the scope of the present disclosure.

What is claimed is:

1. An instrument assembly comprising a touchscreen unit, a display unit and an instrument casing,
   the touchscreen unit further comprises:
   a glass panel with a glass top and a glass bottom to abut the display unit, the glass panel having a glass peripheral edge, a predetermined inner working area encircled by at least one peripheral area in a strip-like shape along the peripheral edge, the peripheral area having at least one cable hole holed through the glass panel, the hole leaving a predetermined seal strip area between the glass peripheral edge and the hole,
   a plurality of touch sensitive electrodes laid along the peripheral area, abutting the inner working area and the cable hole, each of the electrodes is connected to a cable, the cable threaded through the cable hole out of the glass bottom of the glass panel,
   a front sheet to be laid on top of the glass top thereby forming a touch screen gap between the front sheet and the glass top, with the electrodes being within the touch screen gap,
   a substantially continuous top seal strip laid along the seal strip area configured to bond together the front sheet and glass panel, wherein the top seal strip is within the touch screen gap, and,
   wherein the front sheet completely covers the glass panel, the electrodes, the cable and the top seal strip, and,
   the touchscreen unit is configured to be a sealed and integral piece prior to being assembled with the instrument casing and the display unit, and,
   wherein the touchscreen unit is subsequently sealed to the instrument casing by a substantially continuous bottom seal strip between the glass bottom and the instrument casing.

2. The instrument assembly of claim 1, wherein the glass top is coated with a layer of electrically conductive material.

3. The instrument assembly of claim 1, wherein the top seal strip is double-sided-adhesive.

4. The instrument assembly of claim 1, the front sheet having a sheet edge configured to be flush with the top seal strip and the glass peripheral edge.

5. The instrument assembly of claim 1, wherein the instrument casing further includes a touchscreen receiving ledge configured to encircle and hold the touchscreen unit.

6. The instrument assembly of claim 5, wherein the instrument does not have a bevel abutting the touchscreen receiving ledge to hold or cover the peripheral edge of the touchscreen.

7. The instrument assembly of claim 5, wherein the bottom seal strip is configured to attach the glass bottom along the seal strip area to the ledge of the instrument casing when the touchscreen unit is assembled with the instrument casing.

8. The instrument assembly of claim 7, wherein the bottom seal strip functions to seal the touchscreen unit to the ledge of the instrument casing.

9. The instrument assembly of claim 1, wherein the front sheet has a sheet top and a sheet bottom.

10. The instrument assembly of claim 9, wherein the front sheet is rigid enough to hold a layer of air gap between the front sheet and the glass top and is flexible enough to deform when pressed on the sheet top so that the sheet bottom comes into contact to the glass top.

11. The instrument assembly of claim 1, wherein the peripheral area of the glass top further includes at least one vent hole holed through the glass panel, the hole leaving a predetermined seal strip area between the edge and the hole.

12. The instrument assembly of claim 1, wherein the cable hole can be used for venting, negating the necessity for additional vent holes.

13. The instrument assembly of claim 1, wherein the display unit is a liquid crystal display.

14. The instrument assembly of claim 1, wherein the display unit is affixed to the instrument casing and configured to be closely abutting the glass bottom.

15. A touchscreen assembly comprises:
    a glass panel with a glass top and a glass bottom to abut a display unit, the glass panel having a glass peripheral edge, a predetermined inner working area encircled by at least one peripheral area in a strip-like shape along the peripheral edge, the peripheral area having at least one cable hole holed through the glass panel, the hole leaving a predetermined seal strip area between the glass peripheral edge and the hole,
    a plurality of touch sensitive electrodes attached to the glass top and laid along the peripheral area, abutting the inner working area and the cable hole, each of the electrodes is connected to a cable, the cable threaded through the cable hole out of the glass bottom of the glass panel,
    a layer of front sheet, the front sheet to be laid on top of the glass top, thereby forming a touch screen gap between the front sheet and the glass top, with the electrodes being within the touch screen gap,
    a substantially continuous top seal strip laid along the seal strip area configured to bond together the front sheet and glass panel, wherein the top seal strip is within the touch screen gap, and,
    wherein the front sheet completely covers the glass panel, the electrodes, the top seal strip and the cable, and
    the touchscreen assembly is configured to be a sealed and integral piece prior to being further assembled onto an instrument, and,
    wherein the touchscreen assembly is subsequently sealed to an instrument casing by a substantially continuous bottom seal strip between the glass bottom and the instrument casing.

16. The touchscreen assembly of claim 15, wherein the glass top is coated with a layer of electrically conductive material.

17. The touchscreen assembly of claim 15, wherein the top seal strip is double-sided-adhesive.

18. The touchscreen assembly of claim 15, the front sheet having a sheet edge configured to be flush with the top seal strip and the glass peripheral edge.

19. The touchscreen assembly of claim 15 is further configured to be installed onto the instrument with the instrument casing, the casing further includes a touchscreen receiving ledge configured to encircle and hold the touchscreen assembly.

20. The touchscreen assembly of claim 19, wherein the bottom seal strip is configured to attach the glass bottom along the seal strip area to the ledge of the instrument casing when the touchscreen assembly is assembled with the instrument casing.

21. The touchscreen assembly of claim 17 is further configured to be paired with a display unit which is affixed to the instrument casing and configured to be closely abutting the glass bottom.

22. The touchscreen assembly of claim 15, wherein the cable hole can be used for venting, negating the necessity for additional vent holes.

\* \* \* \* \*